US012664082B2

(12) United States Patent
Raghava et al.

(10) Patent No.: US 12,664,082 B2
(45) Date of Patent: Jun. 23, 2026

(54) FLUSHING CACHE LINES INVOLVING PERSISTENT MEMORY

(71) Applicant: Altera Corporation, San Jose, CA (US)

(72) Inventors: Sharath Raghava, Los Gatos, CA (US); Nagabhushan Chitlur, Portland, OR (US); Harsha Gupta, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 18/987,844

(22) Filed: Dec. 19, 2024

(65) Prior Publication Data

US 2025/0117319 A1     Apr. 10, 2025

Related U.S. Application Data

(63) Continuation of application No. 17/133,799, filed on Dec. 24, 2020, now Pat. No. 12,204,441.

(51) Int. Cl.
| | |
|---|---|
| *G06F 3/06* | (2006.01) |
| *G06F 1/30* | (2006.01) |
| *G06F 9/30* | (2018.01) |
| *G06F 12/02* | (2006.01) |
| *G06F 12/0891* | (2016.01) |
| *G06F 12/0895* | (2016.01) |

(52) U.S. Cl.
CPC ............ *G06F 12/0238* (2013.01); *G06F 1/30* (2013.01); *G06F 9/30047* (2013.01); *G06F 12/0891* (2013.01); *G06F 12/0895* (2013.01); *G06F 2212/466* (2013.01)

(58) Field of Classification Search
CPC ............. G06F 12/0891; G06F 12/0895; G06F 9/30047; G06F 1/30; G06F 12/0238; G06F 2212/1028; G06F 2212/205
USPC ............... 711/154, 12.001, 12.008, 170, 103
See application file for complete search history.

(56) References Cited

U.S. PATENT DOCUMENTS

| | | | |
|---|---|---|---|
| 2011/0252201 A1 | 10/2011 | Koren et al. | |
| 2014/0075122 A1* | 3/2014 | Banikazemi ............ | G06F 11/00 |
| | | | 711/E12.002 |
| 2014/0195480 A1 | 7/2014 | Talagala et al. | |
| 2014/0258620 A1* | 9/2014 | Nagarajan ........... | G06F 12/0815 |
| | | | 711/120 |
| 2015/0006815 A1 | 1/2015 | Madhusudana et al. | |
| 2015/0161037 A1 | 6/2015 | Jayakumar et al. | |
| 2016/0034188 A1 | 2/2016 | Bisht | |
| 2016/0179667 A1 | 6/2016 | Kumar et al. | |

(Continued)

OTHER PUBLICATIONS

European Communication (Article 94(3)); EP Application No. 21197142.9; dated Jan. 24, 2024.

*Primary Examiner* — Jared I Rutz
*Assistant Examiner* — Edward Waddy, Jr.
(74) *Attorney, Agent, or Firm* — Fletcher Yoder, PC

(57) ABSTRACT

A method includes receiving, via a communication link and at a device of an integrated circuit system, a cache line comprising a destination address, determining, via the device, a type of memory or storage associated with the destination address, the type of memory or storage comprising persistent or non-persistent, and tagging the cache line with metadata in a manner indicating the type of memory or storage associated with the destination address.

20 Claims, 4 Drawing Sheets

(56) References Cited

U.S. PATENT DOCUMENTS

| | | | | |
|---|---|---|---|---|
| 2016/0179687 | A1 | 6/2016 | Kumar et al. | |
| 2017/0149925 | A1 | 5/2017 | Yang et al. | |
| 2017/0315889 | A1* | 11/2017 | Delaney | G06F 11/1441 |
| 2018/0011714 | A1 | 1/2018 | Han et al. | |
| 2018/0348847 | A1* | 12/2018 | Lai | G06F 12/0846 |
| 2019/0004960 | A1 | 1/2019 | Wang et al. | |
| 2019/0087344 | A1* | 3/2019 | Hijaz | G06F 12/128 |
| 2019/0384837 | A1 | 12/2019 | Kumar et al. | |
| 2020/0174696 | A1* | 6/2020 | Sethuraman | G06F 3/068 |

* cited by examiner

FLUSHING CACHE LINES INVOLVING PERSISTENT MEMORY

CROSS-REFERENCE TO RELATED APPLICATIONS

This application claims priority to U.S. application Ser. No. 17/133,799, filed Dec. 24, 2020, which is incorporated by reference herein in its entirety.

BACKGROUND

The present disclosure relates generally to flushing operations on an integrated circuit. More particularly, the present disclosure relates to handling persistent memory during flush operations on one or more circuit dies.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Peripheral Component Interconnect Express (PCIe) links can be used to connect a device (e.g., a field programmable gate array (FPGA)) to a central processing unit. The device may receive instructions from the central processing unit, and may act on the instructions to perform one or more tasks. The device may also be connected to one or more memories, but the one or more memories may be private to the device (e.g., not readily accessible to the central processing unit) due to limitations of the PCIe linking. As such, the central processing unit and the device or memory controller of the one or memories may need to perform a direct media access (DMA) operation to communicate with each other and with the one or memories (e.g., to perform a memory read or memory write to the one or more memories). Such DMAs are costly in power and time.

To overcome the memory-related limitations of Peripheral Component Interconnect Express (PCIe) links, communication links (e.g., coherent links) can be used to increase an amount of memory or storage readily available to a computer processing unit (CPU) and managed by an operating system. Indeed, when a coherent link is used to connect a device to a central processing unit, the device and the central processing unit can participate in each other's memory pools-without direct media access (DMA) operations. That is, memories coupled to or managed by the central processing unit and the memories coupled to or managed by the device may, via the coherent link, be standard memory and logically similar. Such application is called memory expansion.

One type of memory that may be coupled to the central processing unit is persistent memory. Persistent memory stores data that is maintained even when there is a power loss. That is, during or after a power loss event, data stored in persistent memory is conserved. Another type of memory that may be coupled to the central processing unit is volatile memory. Volatile memory stores data that is loss when the volatile memory loses power. Similar types of memories may be coupled to the device. The coherent link allows both the persistent memory and the volatile memory coupled to either of the central processing unit and device to function as standard memory of the operating system. A flush instruction may move cache lines directed to persistent memory and cache lines directed to volatile memory from the central processing unit to its destination memory (e.g., the persistent memory coupled to the device and the volatile memory coupled to the device). However, no tag or distinction between the persistent memory cache lines or the volatile memory cache lines may exist in the memory hierarchy.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
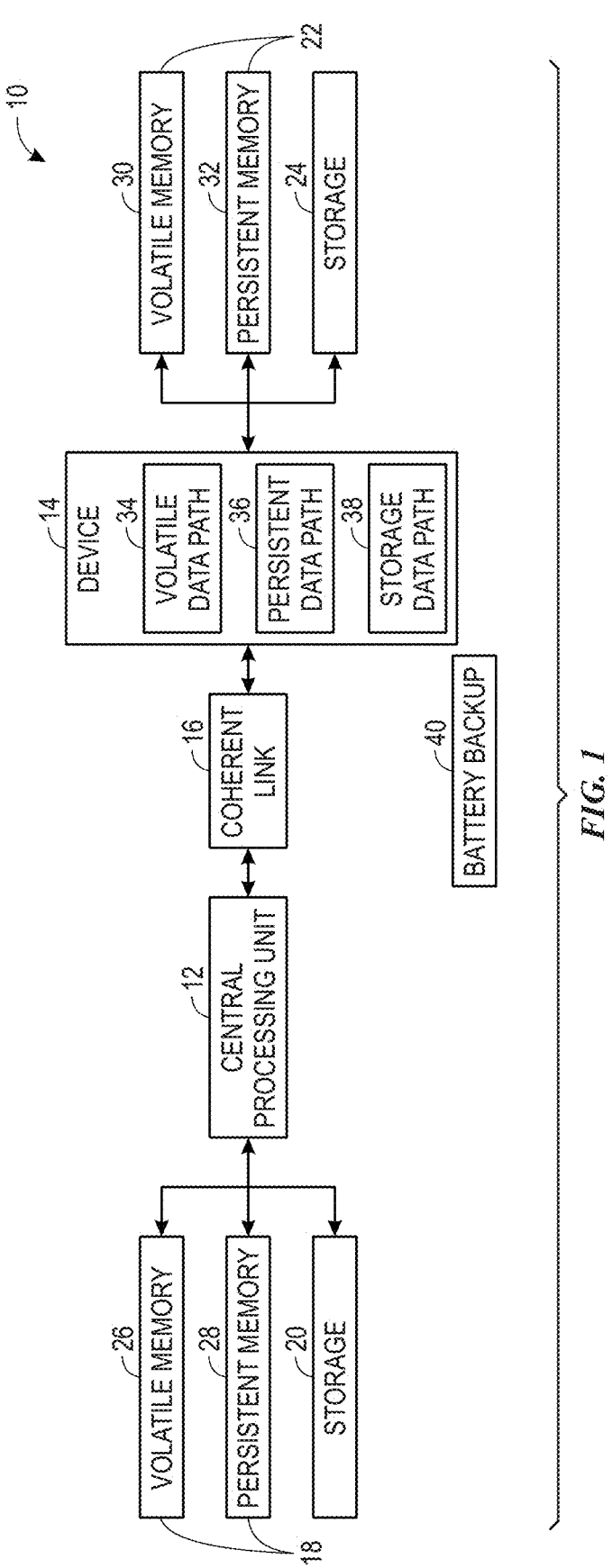
FIG. 1 is a block diagram of an integrated circuit system including a central processing unit, a device, and a coherent link, wherein the device is coupled to persistent memory and volatile memory, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

An integrated circuit system may include a central processing unit and a device connected to the central processing unit via a coherent link. The device may support or be coupled to persistent memory and volatile memory. Since the central processing unit and the device are coherently connected, the memories coupled to the device can participate in the memory pool of the central processing unit. As such, memory coupled to the central processing unit and memory coupled to the device may be logically similar and function as standard memory. At various times, the integrated circuit system may receive a power failure signal. It is beneficial for the integrated circuit system to maintain certain memory during and after a power failure event. Indeed, only certain types of memories may maintain data after losing power.

The central processing unit and the device may be coupled to various types of memories including a volatile memory and a persistent memory. Volatile memory stores data that is loss when the volatile memory losses power. Accordingly, after a power loss event, data stored in volatile memory is not recoverable because volatile memory needs a certain amount of power to maintain its state.

Persistent memory stores data that is maintained even when there is a power loss. That is, during or after a power loss event, data stored in persistent memory is conserved. During a power loss event, it is beneficial to flush and ensure that cache lines directed to persistent memory arrive at persistent memory because the data stored in the cache lines is not persistent until it is in the persistent memory.

The present embodiments generally relate to systems and methods for flushing cache lines to persistent memory. The systems and methods provided herein include tagging cache lines to provide a distinction between cache lines directed to persistent memory and cache lines directed to volatile memory. For example, these cache lines may be tagged as directed to persistent memory and/or directed to volatile memory in a memory hierarchy of an integrated circuit system. Cache lines directed to storage may also be tagged. The systems and methods disclosed herein may be particularly useful during a power loss event on the integrated circuit system. For example, in response to the integrated circuit system receiving an indication that a power loss event is occurring, cache lines directed to volatile memory may be gracefully completed (e.g., responded with a response and dropped), while cache lines directed to persistent memory may be committed to the persistent memory destination. Advantages of the systems and methods disclosed herein include, among other things, the optimization of: memory controller processing delay, reads processing delay, volatile write processing delay, and persistent write processing delay. Indeed, using the present techniques memory controller processing delay, reads processing delay, volatile write processing delay, and persistent write processing delay are optimized because the integrated circuit system may process and completely flush only tagged cache lines or only untagged cache lines, which may be useful especially during a power loss event.

FIG. 1 is a block diagram of an integrated circuit system 10 in accordance with an embodiment of the present disclosure. The integrated circuit system 10 includes a central processing unit 12, a device 14, a communication link (e.g., in the illustrated embodiment, a coherent link 16) attaching the device 14 to the central processing unit 12, and a battery backup 40. The central processing unit 12 may be any suitable central processing unit such as an INTEL® XEON® processor. The device 14 may be any suitable device such as a field programmable gate array (FPGA) device or an application-specific integrated circuit (ASIC) device. The central processing unit 12 and the device 14 are coupled to each other via the coherent link 16 (e.g., a coherent attached actuator or a coherent attached device). For example, the coherent link 16 may be any suitable coherent link such as INTEL® Ultra Path Interconnect (INTEL® UPI) or Computer Express Link (CXL). The integrated circuit system 10 also includes memories 18 and a storage 20 coupled to the central processing unit 12 and memories 22 and a storage 24 coupled to the device 14.

Specifically, in the illustrated embodiment, the central processing unit 12 is coupled to a volatile memory 26 (e.g., one or more of Double Data Rate 4 (DDR4), Double Data Rate 5 (DDR5), Low Power Double Data Rate 4 (LPDDR4)), a persistent memory 28 (e.g., Intel® Optane™ Persistent Memory, Intel® Optane™ Solid State Devices (SSDs), Intel® Optane™ Dual In-Line Memory Module (DIMMs)), and the storage 20. The volatile memory 26, the persistent memory 28, and the storage 20 are managed by an operating system of the integrated circuit system 10. The device 14 is coupled to a volatile memory 30, a persistent memory 32, and the storage 24 that are also managed by the operating system of the integrated circuit system 10. The coherent link 16 allows the device 14 to function as a memory controller to the volatile memory 30 and the persistent memory 32 for the central processing unit 12. The coherent link 16 also allows the volatile memory 30 and the persistent memory 32 to function as standard operating system memory, which the central processing unit 12 can access without using a direct media access (DMA). The storage 24 coupled to the device 14 is also standard operating system storage, and as such, is accessible to the central processing unit 12 without using a direct media access (DMA). The volatile memory 26, the persistent memory 28, and the storage 20 may be logically similar to the volatile memory 30, the persistent memory 32, and the storage 24, each functioning as standard operating system memory or storage, respectively. As such, direct media access (DMA) operations between the central processing unit 12 and the device 14 may not be necessary for the central processing unit 12 to write or read from the persistent memory 32, the volatile memory 30, or the storage 24.

Data may move around the integrated circuit system 10 in quantities (e.g., 64-byte) called cache lines. The cache lines may also carry requests such as a read or write request for reading from or writing to a memory or storage. Cache lines from the central processing unit 12 may be provided to the device 14 through the coherent link 16. The coherent link 16 may be configured to perform operations including decoding and directing the cache lines to particular memory channels. The device 14 includes a volatile memory data path 34, a persistent memory data path 36, and a storage data path 38. These data paths function to process the cache lines directed to the respective data paths. That is, cache lines involving the volatile memory 30 may be sent to the volatile memory data path 34, cache lines involving the persistent memory 32 may be sent to the persistent memory data path 36, and cache lines involving the storage 24 may be placed on the storage data path 38. In some embodiments, the only data path in the device 14 is the persistent memory data path 36. Also, in some embodiments, the device 14, the memories 22, and the storage 24 may be located on a peripheral component interconnect express (PCIe) card or on a motherboard of the integrated circuit system 10.

The integrated circuit system 10 is configured to identify cache lines directed to persistent memory and tag metadata to distinguish the cache lines directed to persistent memory from cache lines directed to the volatile memory in the memory hierarchy. For example, logic circuitry of the central processing unit 12 may be configured to identify and tag persistent memory directed cache lines with metadata indicative of the cache lines being directed to the persistent memory 28 and logic circuitry or soft logic of or on the device 14 may be configured to identify and tag persistent memory directed cache lines with metadata indicative of the cache lines being directed to the persistent memory 32. In some cases, the integrated circuit system 10 may determine a type of memory or storage associated with a destination address of the cache line. The type of memory or storage may be a persistent (e.g., persistent memory, storage) or non-persistent (e.g., volatile memory), and the tagging of the cache line may include tagging the cache line with metadata in a manner indicating the type of memory or storage associate with the destination address.

While the systems and techniques discussed herein specifically reference coherent links (e.g., the coherent link 16), it should be noted that embodiments are not limited to coherent links. Indeed, the systems and techniques discussed herein may involve integrated circuit devices involving a non-coherent link (e.g., a standard peripheral component interconnect express (PCIe)) instead of the coherent link 16. Accordingly, in some embodiments, integrated circuit devices may alternatively include non-coherent links coupling the device 14 to the central processing unit 12.

As the integrated circuit system 10 operates, the central processing unit 12 may perform operations involving persistent memory, volatile memory, and/or storage. Accordingly, cache lines may be moved from the central processing unit 12 to the desired persistent memory destination, the desired volatile memory destination, and/or the desired storage destination. The central processing unit 12 may flush cache lines to memory or storage destinations. For example, the central processing unit 12 may flush cache lines to power-fail protected domains to protect data when a power failure signal is received by the central processing unit 12. Flushing may involving moving cache lines involving a request such as a write request to a particular destination of the write request. For example, a cache line originated by the central processing unit 12 and storing a write request to the persistent memory 28 may be flushed to the persistent memory 28, which is the final destination of the cache line. Cache lines may be flushed from the central processing unit 12 to the volatile memory 26, the persistent memory 28, or the storage 20. Cache lines may also be flushed from the central processing unit 12 to the volatile memory 30, the persistent memory 32, or the storage 24. It takes a finite amount of time for a cache line to be flushed to the volatile memory 30, the persistent memory 32, or the storage 24. Cache lines that are destined to the volatile memory 30, the persistent memory 32, or the storage 24, are pending (e.g., not committed to a destination) until they arrive at the volatile memory 30, the persistent memory 32, or the storage 24. For example, a cache line directed to the persistent memory 32 is pending when the cache line is still in the coherent link 16, a memory hierarchy of the central processing unit 12, or in the device 14. Indeed, the cache line is not committed to a memory until the cache line arrives at the particular memory or storage destination. This is important to note because pending cache lines may be subject to being dropped if the integrated circuit system 10 does not have enough power to commit the cache line to its memory destination.

A flushing operation may include a cache line being transmitted to a memory destination. For example, a cache line originating from the central processing unit 12 may be directed to the persistent memory 32 coupled to the device 14. As such, the cache line will be transmitted from the central processing unit 12 through the coherent link 16 to the device 14 and eventually to the persistent memory 32. In some cases, to hasten completion of flushing operations in response to receiving a power failure signal, the integrated circuit system 10 may commit to memory only tagged cache lines directed to the persistent memory 28 or the persistent memory 32. In these cases, selectively committing only cache lines directed to the persistent memory 28 or the persistent memory 32 to memory, as indicated by the tagging, while refraining from committing unto memory destination cache lines directed to the volatile memory 26 or the volatile memory 30, may hasten completion of flush operations. Indeed, such tag-based selective committing can be used to hasten flush operations and reduce an amount of power needed to sustain the integrated circuit system 10 after the integrated circuit system 10 detects a power failure. As such, the total time to flush all the cache lines may be reduced to the total time to flush queues containing cache lines directed to the persistent memory 28 and cache lines directed to the persistent memory 32.

At a certain time, a power failure may occur on the integrated circuit system 10. That is, a power supply of the integrated circuit system 10 may fail to provide ample power for the integrated circuit system 10 to continue operating via, for example, an alternating current (A/C) power source. When a power failure occurs, the integrated circuit system 10 may be liable to losing information stored in pending cache lines, which are cache lines that are not yet committed to a memory or storage destination and/or information stored in the volatile memory 26 and the volatile memory 30. As mentioned above, the persistent memory 28, persistent memory 32, the storage 20, and the storage 24 may not be liable to losing cache line data committed to persistent memory or storage, as persistent memory and storage is retained upon a power loss. As such, without flushing and committing cache lines directed to persistent memory to persistent memory, the integrated circuit system 10 may lose the information in the cache lines directed to persistent memory. In addition, flushing cache lines may consume a finite amount of time to complete. As such, it is desirable to have a secondary power source or a power source that may provide power to the integrated circuit system 10 when the integrated circuit system 10 detects a power failure so that its cache lines—and in particular, its cache lines directed to persistent memory destinations are allotted enough time to completely flush to persistent memory.

With this in mind, to mitigate the effects of a power failure, the integrated circuit system 10 includes a battery backup 40. The battery backup 40 is configured to power the integrated circuit system 10 or specific components of the integrated circuit system 10 in response to a detection of a power failure of a power supply of the integrated circuit system 10. The battery backup 40 may provide power to components of the integrated circuit system 10 for a finite amount of time (e.g., 100 micro seconds, 10 milliseconds). Such power may be used to, for example, flush cache lines (e.g., memory write requests) from the central processing unit 12 to the volatile memory 30, the persistent memory 32, or the storage 24. In the present embodiment, the battery backup 40 is configured to provide enough power to commit the pending persistent memory cache lines to persistent memory. In some embodiments, the battery backup 40 can be configured to provide enough power to commit the pending persistent memory cache lines to persistent memory and commit pending storage cache lines to storage. For example, a time duration for sustained power may be determined based upon the amount of caches lines that need to be flushed to the persistent memory or storage. The battery backup 40 may be optimized for flushing the persistent memory cache lines without accounting for flushing the volatile memory cache lines. Indeed, the volatile memory cache lines may not need to be flushed to system memory because volatile memory loses its state after it fails to receive power.

When a power loss event occurs, cache lines that are still pending (e.g., not in the persistent memory 28 or the persistent memory 32, the storage 20 or the storage 24, or the volatile memory 26 or the volatile memory 30) may not arrive at their memory destination. For example, even though a cache line may be intended to be committed to the persistent memory 28 or the persistent memory 32, the cache line is not persistent, until the cache line is committed to the persistent memory 28 or the persistent memory 32. As such, when a cache line is directed to persistent memory but still pending (e.g., is not in persistent memory), and a power failure occurs, the cache line will not be sustained, but rather, will be lost or dropped. If power is restored to the integrated circuit system 10 after the dropping of the cache line directed to the persistent memory 28 or the persistent memory 32, the central processing unit 12 may not be able to read the cache line from the persistent memory 28 or the persistent memory 32 since the cache line was dropped before it entered the persistent memory 28 or the persistent memory 32. Likewise, cache lines involving the persistent memory 28 or the persistent memory 32, the storage 20 or the storage 24, or the volatile memory 26 or the volatile memory 30 are not considered to be flushed until the cache lines have arrived at the persistent memory 28 or the persistent memory 32, the storage 20 or the storage 24, or the volatile memory 26 or the volatile memory 30.

The power from the battery backup 40 may be used by the integrated circuit system 10 to flush cache lines to their respective memory or storage destinations in the event of a power failure. In response to receiving an indication of a power failure, the integrated circuit system 10 may be configured to prioritize flushing of certain cache lines. For example, the integrated circuit system 10 may be configured to Only process cache lines that are directed to the persistent memory 28 or the persistent memory 32. As mentioned above, metadata tagging may be indicative of the cache line being directed to the persistent memory 28 or to the persistent memory 32. Since cache lines directed to the persistent memory 28 or the persistent memory 32 are distinguished from cache lines directed to other memories via the metadata tagging, the integrated circuit system 10 may identify and process the cache lines that are directed to the persistent memory destination and gracefully complete (e.g., responded with a response (e.g., a default response) and dropped), drop the cache lines that are not directed towards a persistent memory destination (e.g., the persistent memory 28 or the persistent memory 32), as indicated by the metadata tagging. The gracefully complete operation may include responding to the cache line with a default response (e.g., one or more zeros). Accordingly, since the number of cache lines needing to be committed to a memory destination are reduced, the battery backup 40 may have a reduced power sustainment requirement. For example the battery backup 40 may need to only have sufficient power for committing the cache lines to a persistent memory destination after a power failure of a power supply (e.g., an alternating current (A/C) power supply) of the integrated circuit system 10. It may be useful to commit to memory the cache lines that are directed to the persistent memory 28 or to the persistent memory 32 and gracefully complete (e.g., responded with a response and dropped), the cache lines that are directed to the volatile memory 26 or the volatile memory 30 because cache lines that are directly to the volatile memory 26 or the volatile memory 30 will be lost when the integrated circuit system 10 shuts down. This is because data stored in the volatile memory 26 and the volatile memory 30 is lost upon the volatile memory 26 and the volatile memory 30 losing power. The volatile memory 26 and the volatile memory 30 requires power to maintain any information stored in the respective volatile memory 26 or the volatile memory 30. In some cases, it may also be useful to commit to storage the cache lines that are directed to the storage 20 or to the storage 24, while refraining from committing other cache lines. Indeed, in some embodiments, cache lines directed to the persistent memory 28, the persistent memory 32, the storage 20, and/or the storage 24, as indicted based upon the metadata tagging of the cache lines, may be selectively ensured to be committed to the persistent memory and storage destinations, distinguishing treatment of these cache lines from the volatile memory cache lines. In such embodiments, the committal of these distinguished cache lines may be ensured by ensuring the battery backup 40 has sufficient power for committing the distinguished cache lines to the persistent memory destinations or the storage destinations after a power failure.

For example, at a particular time, one hundred cache lines may be pending to arrive at a memory destination managed by the device 14. Of the one hundred cache lines, ninety cache lines may be destined to the volatile memory 30 and ten cache lines may be directed to the persistent memory 32. When a power failure is detected by the integrated circuit system 10, the integrated circuit system 10 may process and commit the ten cash lines that are directed to persistent memory 32 and gracefully complete (e.g., responded with a response and dropped), the ninety cache lines that are directed to the volatile memory 26. As such, using present embodiments, it may be sufficient for the battery backup 40 to provide power to the integrated circuit system 10 for $\frac{1}{10}^{th}$ the amount of time it would take to process and commit all one hundred cache lines. The reduced amount of time to flush the cache lines directed to persistent memory, which is incurred in part by refraining from committing volatile memory cache lines to volatile memory, allows for a reduced battery size. As such, the battery backup 40 may be reduced, resulting in a reduced battery costs and battery size. Indeed, in the current example, the battery backup 40 need only to provide sufficient power for ten cache lines directed to the persistent memory 32, as opposed to the power needed to flush the one hundred cache lines. Accordingly, the battery backup 40 may store a reduced amount of energy since the amount of time needed to keep the integrated circuit system 10 alive after the power failure is reduced.

In some embodiments, the battery backup 40 is designed based upon a depth of a persistent memory cache line queue. For example, the battery backup 40 may be designed so as to power the integrated circuit system 10 for a time period calculated based upon an amount of time to process and commit a last out persistent memory cache line of the persistent memory cache line queue. Indeed, the battery backup 40 can be timed to support the cache lines directed to persistent memory without regard to cache lines directed to a volatile memory destination. Accordingly, in some embodiments, when sizing the battery backup 40, the persistent memory cache line queue is factored but not the volatile memory cache line queue. In some embodiments, the battery backup 40 may be designed based upon depths of the persistent memory cache line queue and of the storage cache line queue.

In some embodiments, the integrated circuit system 10 may selectively provide backup power on certain cache line paths to reduce the amount of backup power and cost associated with the battery backup 40. Specifically, the device 14 may include multiple power sources. Each of the multiple power sources may power a specific memory controller. The battery backup 40 may selectively power only the memory controller of the persistent memory 32, when a power failure occurs. As such, the power source powering the volatile memory 30 fails without back up power. As another example, the battery backup 40 may selectively power just the persistent memory data path 36, while the storage data path 38 and the volatile memory data path 34 does not receive backup power from a power source in response to a power failure. Other combinations of battery backup power between may exist in different embodiments. For example, the battery backup 40 may be configured to power the persistent memory data path 36 and the storage data path 38 while the volatile memory data path 34 remains without power.

Figure 2:
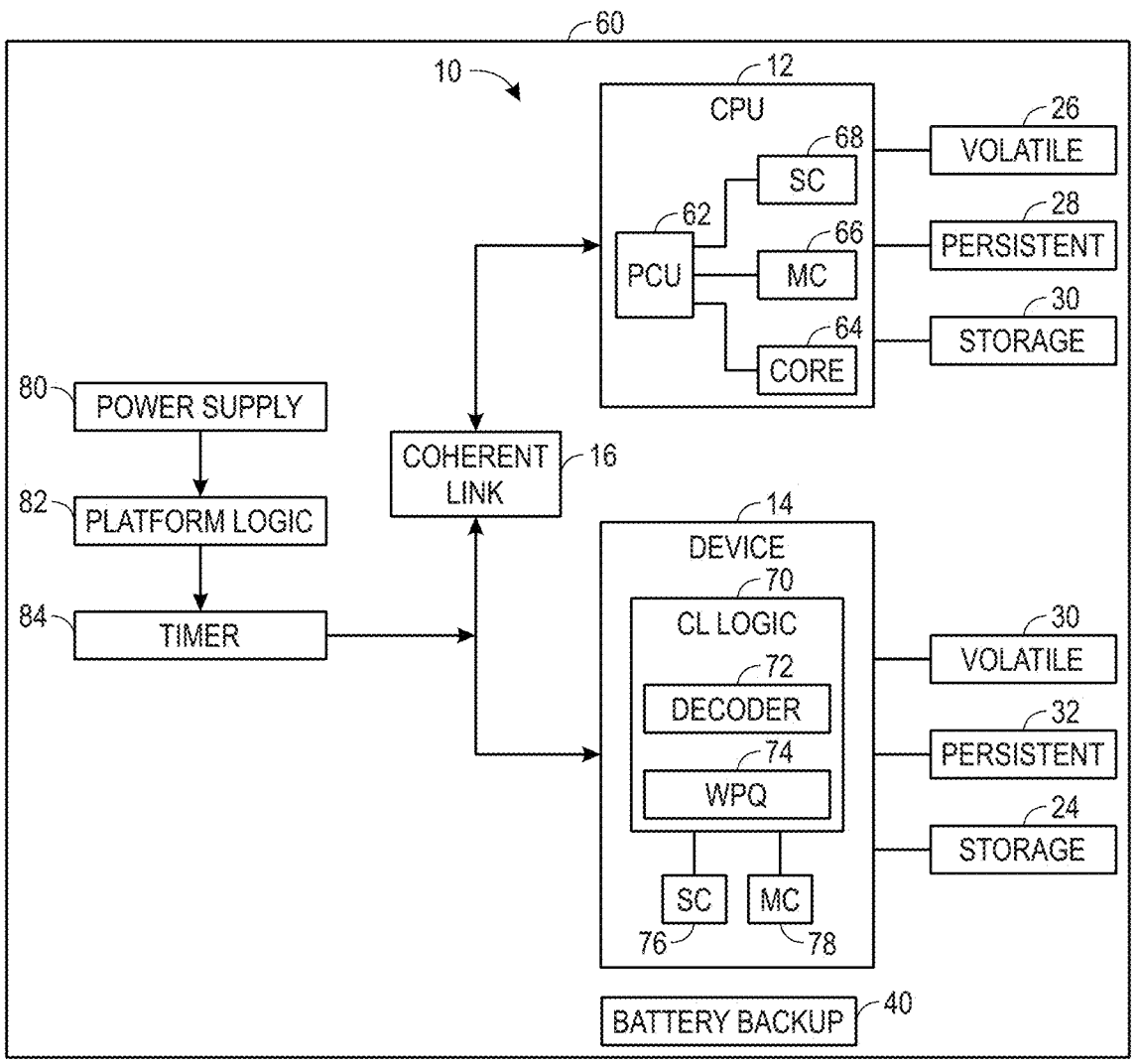
FIG. 2 is a block diagram of components that may result in a power loss flow, in accordance with an embodiment of the present disclosure.

FIG. 2 is a block diagram 60 of a flow involving the integrated circuit system 10 and occurring in response to a detection of a power failure, in accordance with example embodiments of the present disclosure. In the illustrated embodiment, the central processing unit 12 of the integrated circuit system 10 includes a platform controller unit (PCU 62), a core processor (Core 64), a memory controller (MC) 66, and a storage controller (SC) 68. The memory controller 66 represents two memory controllers—one for the volatile memory 26 and one for the persistent memory 28. The storage controller 68 manages the storage 20.

In the illustrated embodiment, the device 14 includes coherent link logic 70 (e.g., soft INTEL® Ultra Path Interconnect (INTEL® UPI) logic), which includes a decoder 72 (e.g., coherent link decoder) for decoding coherent link requests and a write pending queue ("wpq") 74. The write pending queue 74 represents multiple write pending queues—one for the volatile memory 30, one for the persistent memory 32, and one for the storage 24. The device 14 also includes a storage controller 76 for managing the storage 24, and a memory controller 78. The memory controller 78 represents two memory controllers—one for the volatile memory 30 and one for the persistent memory 32. The memory controller 78 may include a non-transitory, tangible, and computer-readable medium that includes instructions executable by a processor of the memory controller 78. The instructions may include instructions for managing the memories coupled to the memory controller 78 and the requests configured to access the memories coupled to the memory controller 78. The storage controller 76 and the memory controller 78 may be configured to store pending operations (e.g., read requests, write requests).

In the illustrated embodiment, the power supply 80 (e.g., an alternating current A/C power supply) powers the integrated circuit system 10. In some embodiments, when the power supply 80 powers the integrated circuit system 10, the integrated circuit system 10 may process both read and write requests regardless of whether tags are detected on cache lines directed towards a storage or a memory destination. At some point in time, a power failure may be detected by the integrated circuit system 10. In response to detecting the power failure, a signal indicative of the power failure may be asserted (e.g., by the power supply 80) to inform the platform logic 82 (e.g., platform logic circuitry) of the detected power failure. The signal may also cause the platform logic 82 to begin power loss operations. A timer 84 (e.g., Platform Control Hub ADR timer) that tracks how long the integrated circuit system 10 may be powered after the power failure is commanded to start and a signal may be sent to both the central processing unit 12 and the device 14 to inform of the power failure. In response to receiving this signal (e.g., data packets indicative of the power failure), the central processing unit 12 may prepare to issue flushes of its memory hierarchy. Specifically, the central processing unit 12 may selectively flush and commit cache lines to the persistent memory 28 and/or the storage 20, while refraining from committing cache lines directed to the volatile memory 26 to the volatile memory 26, based on metadata tagging of the cache lines. The cache lines directed to the volatile memory 26 may be gracefully completed (e.g., responded with a response and dropped). Similarly, the device 14 may selectively change from committing cache lines directed to the persistent memory 32, the volatile memory 30, and the storage 24 to just flushing and committing cache lines directed to the persistent memory 32 or the storage 24, based on metadata tagging of the cache lines, while refraining from committing cache lines directed to the volatile memory 30 to the volatile memory 30. The cache lines directed to the volatile memory 30 may be gracefully processed (e.g., responded with a response and dropped). The battery backup 40 may power the integrated circuit system 10 during the time period specified by the timer. The battery backup 40 and the timer 84 timing may be identified or determined based upon a worst-case scenario for flushing cache lines to the persistent memory 28, the persistent memory 32, the storage 20, and/or the storage 24. For example, the worst-case scenario may include or be based at least in part on the time it may take for one or more cache lines in the central processing unit 12 and destined for the persistent memory 28 to be flushed to the persistent memory 28. The battery backup may be sized based upon a queue length corresponding to an amount of cache lines to be committed to the persistent memory 28 and not based upon a queue length corresponding to an amount of cache lines to be committed to the volatile memory 30.

As previously mentioned, pending cache lines may be in various locations along the integrated circuit system 10. As an example, cache lines directed to any of the persistent memory 28, the volatile memory 26, and the storage 20 may be located in the memory hierarchy of the central processing unit 12, and the cache lines directed to any of the persistent memory 32, the volatile memory 30, and the storage 24 may be located in the memory hierarchy of the central processing unit 12, the coherent link 16, or in the device 14. In either case, during operations performed in response to a detection of a power failure, the integrated circuit system 10 may alter itself from processing and committing pending cache lines directed to each memory and storage destination to identifying and committing, to persistent memory or storage, the respective cache lines directed to persistent memory or storage, and gracefully completing (e.g., responding with a response and dropping) cache lines directed to volatile memory.

Figure 3:
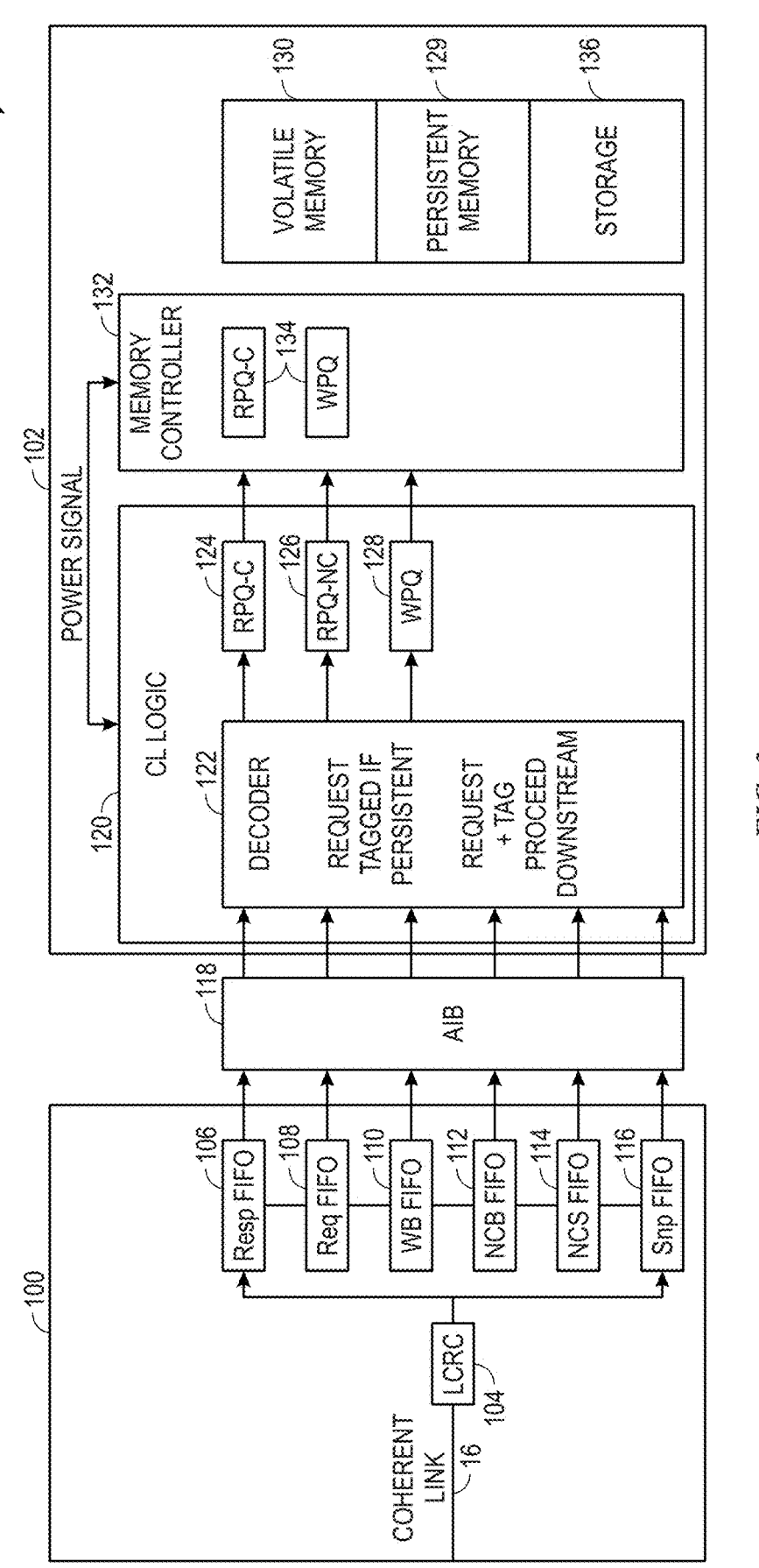
FIG. 3 is a block diagram of components with a data path flow for a cache line for a single-channel memory controller, in accordance with an embodiment of the present disclosure.

FIG. 3 is a block diagram of a data path flow for cache lines entering the device 14 from the coherent link 16 and involving a memory destination (e.g., memory write requests from the central processing unit 12) for a single-channel memory controller, in accordance with an embodiment of the present disclosure. In some embodiments, the data path flow illustrated in FIG. 3 may be used when the integrated circuit system 10 detects a power failure. In the illustrated embodiment, the device 14 includes a first die 100 and a second die 102. At the first die 100, cache lines entering the device 14 from the central processing unit 12 via the coherent link 16 are recorded into appropriate queues. The cache lines are also configured to pass through a link cyclic redundancy check (LCRC 104). In the illustrated embodiment, the cache lines may be recorded, based on attributes of the cache lines, into a response queue (Resp FIFO 106), a request queue (Req FIFO 108), a write batch queue (WB FIFO 110), a non-coherent bypass queue (NCB FIFO 112), a noncoherent standard queue (NCS FIFO 114), or a snooze queue (SNP FIFO 116). For example, a cache line involving a memory write request may proceed to the write batch queue (WB FIFO 110). After the cache lines are recorded in the appropriate queues, the cache lines proceed to the Advanced Interface Bus (AIB 118), which connects the first die 100 to the second die 102. The cache lines then proceed to the second die 102 of the device 14, which, in the illustrated embodiment, includes coherent link logic (CL LOGIC 120) (e.g., coherent link soft logic).

Inside the coherent link soft logic 120, a decoder 122 identifies cache lines directed to persistent memory and tags them with metadata. Alternatively, in some embodiments, cache lines directed to volatile memory may be tagged with metadata. The cache lines, and their tags if applicable, then proceed downstream to appropriate queues including a coherent read pending queue (RPQ-C 124), a non-coherent read pending queue (RPQ-NC 126), and a write pending queue (WPQ 128). In the second die 102 of the device 14, it is determined if the cache lines are directed to the persistent memory 129. If the device 14 determines that a cache line is directed to the persistent memory 129, then the device 14 will tag the cache line with metadata indicative of the cache line being directed to the persistent memory 129. Alternatively, if the device 14 determines that the cache line is directed to volatile memory, then the device 14 may tag the cache line with metadata indicative of the cache line being directed to the volatile memory 130. The cache lines then proceed downstream to the memory controller 132, which may receive cache lines into the respective queues 134. Cache lines that are not tagged as being directed to the persistent memory 129 will be gracefully completed (e.g., responded with a response and dropped), as these cache lines may be directed to the volatile memory 130. In some embodiments, the cache lines that are not tagged as being directed to the persistent memory 129 are dropped in the coherent link soft logic 120 or at the memory controller 132. In some embodiments, hard logic or a combination of coherent link soft logic and hard logic may perform operations similar to the coherent link soft logic 120.

In some embodiments, the control and status registers (CSRs) in the coherent link logic 120 may consist of downstream memories supported, range of memories, and types of memory. An example per memory controller definition of configuration and status register is provided in Table 1 below.

In Table 1, various types of memories are indicated based upon a configuration of the memories controlled by a memory controller. The TYPE field may indicate PERSISTENT if the memory controller only manages persistent memory or VOLATILE if the memory controller only manages volatile memory. BOTH_VP and BOTH_PV types indicate support/management for both persistent memory and volatile memory. Since, in the illustrated embodiment, the memory controller 132 manages the persistent memory 129 and the volatile memory 130, the type indicated by the memory controller is either BOTH_PV or BOTH_VP. In this discussion, it will be assumed that the TYPE is BOTH_VP, which indicates that the memory address in START_RANGE to PARTITION is a memory address of the volatile memory 130 and the memory address in PARTITION to END_RANGE is a memory address of the persistent memory 129.

Table 2 below provides an example of which cache lines directed to a memory controller are tagged in accordance with an embodiment.

| IF (Request address) is in | TYPE | TAG |
|---|---|---|
| START_RANGE to END_RANGE | PERSISTENT | SET |
| START_RANGE to END_RANGE | VOLATILE | CLR |
| START_RANGE to PARTITION | BOTH_PV | SET |
| PARTITION to END_RANGE | BOTH_PV | CLR |
| START_RANGE to PARTITION | BOTH_VP | CLR |
| PARTITION to END_RANGE | BOTH_VP | SET |

In Table 2, different types of cache lines are tagged based upon the location of a memory address in the cache line and/or on a type of memory managed by the memory controller 132. The coherent link logic 120 (e.g., the decoder 122) tags the cache line as being directed to persistent memory if the request address is in START_RANGE to END_RANGE and the type of memory supported by the memory controller is only persistent memory. The coherent link logic 120 does not tag the cache line as being directed to persistent memory if the request address is in START_RANGE to END_RANGE and the type of memory supported by the memory controller is only volatile memory. Since the memory controller manages both the persistent memory and the volatile memory, and since the TYPE is BOTH_VP, which indicates that the memory address in START_RANGE to PARTITION is a memory address of the volatile memory and the memory address in PARTITION to END_RANGE is a memory address of the persistent memory, the location of the memory address in the cache line is determined to determine if the cache line will be tagged. For example, if the request address is in STAR-

| Field | Content | Description |
|---|---|---|
| START_RANGE | Address | Starting range of memory address |
| END_RANGE | | Ending range of memory address |
| PARTITION | | Valid if the type is BOTH* |
| TYPE | PERSISTENT | TYPE = PERSISTENT for the entire |
| | VOLATILE | density is persistent |
| | BOTH_PV | TYPE = VOLATILE for the entire |
| | BOTH_VP | density is volatile |
| | | TYPE = BOTH_PV if START_RANGE |
| | | to PARTITION = persistent |
| | | TYPE = BOTH_VP if START_RANGE |
| | | to PARTITION = volatile |

T_RANGE to PARTITION, and the type of memory managed by the memory controller is BOTH_VP, then the coherent link logic 120 does not tag the cache line because the requested memory address is the volatile memory. If the request address is in PARTITION to END_RANGE, and the type of memory managed by the memory controller is BOTH_VP, then the coherent link logic 120 tags the cache line because the requested memory address is the persistent memory.

It should be noted that similar processes described with regard to FIG. 3 may be present in a data path flow for cache lines entering the device 14 from the coherent link 16 in involving a storage destination (e.g., storage write requests from the central processing unit 12). Indeed, a storage controller (not shown in FIG. 3) may manage the storage 136 and the decoder 122 may determine if the cache line storage requests are to be tagged or not and committed or not to the storage 136.

In some embodiments, as illustrated in FIG. 3, cache lines directed to the volatile memory 130 or directed to the storage 136 are additionally and/or alternatively tagged with metadata. For example, memory cache lines directed to the volatile memory 130 may be tagged with metadata, and the untagged memory cache lines (e.g., the cache lines directed to persistent memory) may be identified and committed to the persistent memory destination.

Figure 4:
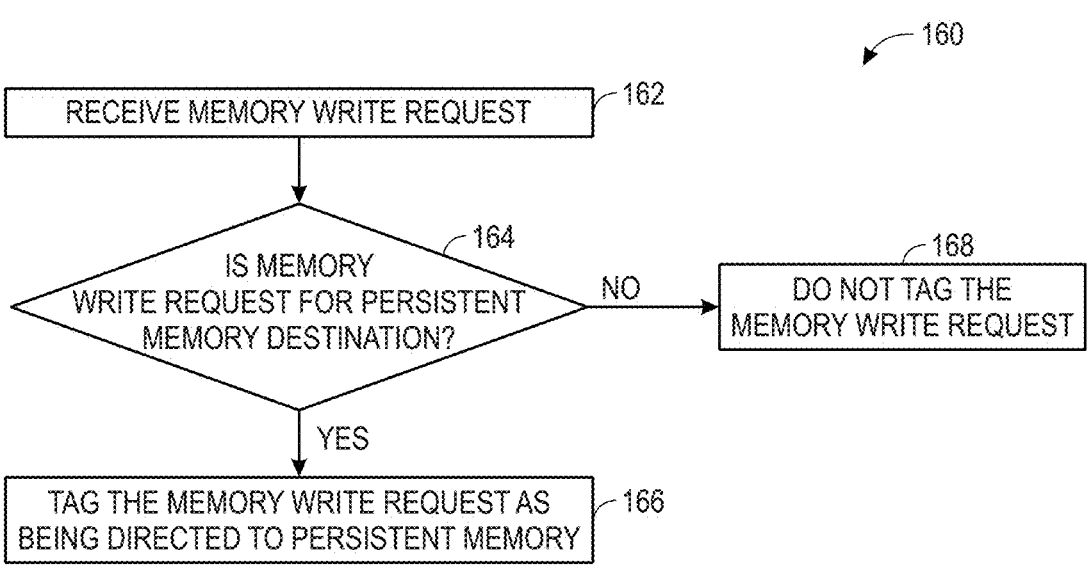
FIG. 4 is a flowchart, illustrating a process for tagging a cache line that is directed to persistent memory and that stores a memory write request, in accordance with an embodiment of the present disclosure.

FIG. 4 is a process 160 for tagging a cache line that is directed to persistent memory and that stores a memory write request. In some embodiments, the process 160 may be performed by the device 14, the central processing unit 12, or the decoder 72.

The process 160 includes receiving (Block 162) a memory write request. The memory write request may have originated from the central processing unit 12 and may be directed towards a persistent memory managed by the device 14. Alternatively, the memory write request may have originated from the central processing unit 12 and may be directed towards a persistent memory managed by the central processing unit 12.

It is determined (Block 164) if the memory write request is destined for persistent memory. For example, the range address of the memory write request may be decoded via a decoder (e.g., the decoder 122 or a decoder of the central processing unit 12) to determine the destination of the memory write request.

If the memory write request is destined for persistent memory, the process 160 proceeds to tagging (Block 166) the memory write request as being directed to a persistent memory destination. The memory write request may be tagged with metadata. For example, in response to decoding the range address of the memory write request and determining, via the decoder, that the range address is persistent memory, the decoder may tag the memory write request as being direct to persistent memory.

Returning to Block 164, if the memory write request is not destined to persistent memory, then the process 160 proceeds to not tagging (Block 168) the memory write request as being directed to persistent memory. It should be noted that in some embodiments, write request that are not tagged as being destined to persistent memory may still be tagged-tagged as directed to the appropriate destination (e.g., volatile memory or storage). In these embodiments, the tagging of these write requests that are not destined for persistent memory may indicate a different destination. Similar operations denoted in the process 160 may be performed by a storage controller. Also, cache lines storing other requests (e.g., read requests) involving a memory destination may be utilized in an embodiment of the process 160.

Other embodiments of the process 160 include tagging or distinguishing cache lines directed to storage and/or cache lines directed to volatile memory. For example, cache lines directed to a storage destination may be decoded via a decoder, to determine the range address of the storage destination. Based upon a determination of the range address of the cache line directed to the storage destination, the cache line may be tagged or not. Similarly, cache lines directed to volatile memory may be decoded via the decoder to determine the range address of the memory destination of the cache line. Based upon a determination that the range address of the cache line is directed to the volatile memory destination, the cache line may be tagged, thus providing a distinguishing feature between the persistent memory cache lines and the volatile memory cache lines.

Figure 5:
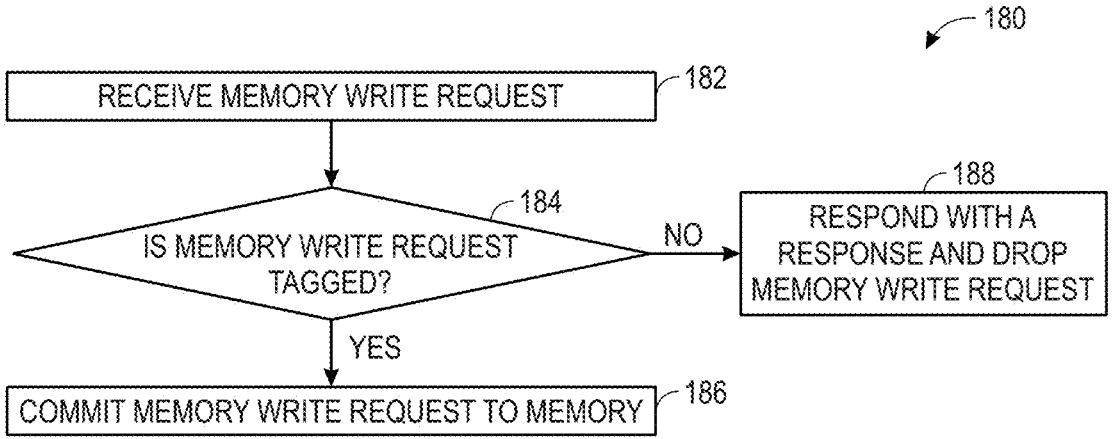
FIG. 5 is a flowchart, illustrating a process for determining whether to commit or gracefully drop a cache line storing a memory write request, in accordance with an embodiment of the present disclosure.

FIG. 5 is a process 180 for determining whether to commit or gracefully drop (e.g., respond with a response and drop) a cache line storing a memory write request, in accordance with an embodiment of the present disclosure. In some embodiments, the process 180 may be performed by the device 14 or the central processing unit 12. For example, the process 180 may be performed by the memory controller of central processing unit 12 or a memory controller of the device 14.

At Block 182, the memory controller receives a memory write request. The memory write request may involve data to write to a memory managed by the memory controller.

The memory controller proceeds to determining (Block 184) if the memory write request is tagged. For example, the memory write request may be tagged with metadata that may be used to determine a destination of the memory write request-whether it's a memory write request to persistent memory or to volatile memory. The metadata may indicate that the memory write request is directed to persistent memory.

In response to the memory write request being tagged, the memory controller may commit (Block 186) the memory write request to memory. For example, the memory write request may be committed to persistent memory in response to the memory write request being tagged as directed to persistent memory.

Returning to Block 184, if the memory controller determines that the memory write request is not tagged, then the memory controller may gracefully complete (e.g., respond with a response and drop) (Block 188) the memory write request. Such actions of the process 180 may be beneficial especially if memory write requests that are tagged as directed to persistent memory and memory write requests that are not tagged are directed to volatile memory. In particular, in this case, during a power failure, memory write requests direct to volatile memory may be completed gracefully (e.g., responded with a response and dropped), since data in the volatile memory will be lost after the power failure has occurred.

Similar operations denoted in the process 180 may be performed by a storage controller when the storage controller receives a storage write request. Also, cache lines storing other requests (e.g., read requests) may be utilized in an embodiment of the process 180. During a power failure event, the memory controller or the storage controller may selectively process read requests by responding with zeros and gracefully exiting the read requests. Also, during the power failure event, the memory controller or storage controller may selectively process write requests by committing to the memory or storage destination, the tagged write requests, and gracefully completing (e.g., responding with a response and dropping) the untagged write requests.

The present systems and techniques relate to embodiments for optimizing flush operations in devices by prioritizing persistent cache line flushing during a power failure. In particular, the present systems and techniques reduced the amount of time necessary to keep the integrated circuit system 10 alive after the integrated circuit system 10 detects a power failure by selectively refraining from completing certain cache line flushes (e.g., not committing cache lines to a certain memory or storage destinations). Such reduced amount of time also reduces the amount of power necessary to complete pending flush operations. As such, a battery backup size may be based upon an amount of cache lines directed to persistent memory as opposed to being based on an amount of cache lines directed to persistent memory and cache lines directed to volatile memory.

EXAMPLE EMBODIMENTS

Example Embodiment 1. A method comprising:

receiving, via a coherent link and at a device of an integrated circuit system, a cache line comprising a destination address;

determining, via the device, a type of memory or storage associated with the destination address, the type of memory or storage comprising persistent or non-persistent; and tagging the cache line with metadata in a manner indicating the type of memory or storage associated with the destination address.

Example Embodiment 2. The method of example embodiment 1, comprising:

in response to determining that the type of memory or storage associated with the destination address is persistent:

tagging the cache line with metadata indicative of the cache line being directed to persistent memory; and in response to determining that the type of memory or storage associated with the destination address is non-persistent:

refraining from tagging the cache line with the metadata indicative of the cache line being directed to persistent memory; and processing the cache line based upon the presence or lack of metadata indicative of the cache line being directed to persistent memory.

Example Embodiment 3. The method of example embodiment 1, comprising:

receiving a power fail signal at the integrated circuit system; and in response to receiving the power fail signal and the cache line comprising a memory write request:

selectively committing the cache line to persistent memory when the tagging indicates that the type of memory or storage associated with the destination address is persistent; and otherwise, selectively refraining from committing the cache line to volatile memory when the tagging indicates that the type of memory associated with the destination address is non-persistent.

Example Embodiment 4. The method of example embodiment 1, comprising:

in response to receiving a power fail signal and the cache line comprising a memory read request:

dropping the memory read request and returning a response indicative of the dropping.

Example Embodiment 5. The method of example embodiment 1, comprising:

in response to receiving a power fail signal and the cache line comprising a storage write request:

committing the cache line to storage.

Example Embodiment 6. The method of example embodiment 1, comprising:

processing, via a memory or storage controller, the cache line regardless of what the tag of the cache line indicates.

Example Embodiment 7. The method of example embodiment 1 performed by coherent link soft logic in the device.

Example Embodiment 8. An integrated circuit system comprising:

a central processing unit;

a device comprising:

a memory controller configured to manage memory coupled to the device; and a decoder configured to decode a cache line to determine a destination of the cache line;

a communication link coupling the device to the central processing unit;

a volatile memory coupled to the device; and a persistent memory coupled to the device;

wherein the integrated circuit system is configured to:

receive a cache line;

identify whether the cache line is directed to the persistent memory or the volatile memory; and tag, with metadata, the cache line to distinguish cache lines directed to the persistent memory from cache lines directed to the volatile memory.

Example Embodiment 9. The integrated circuit system of example embodiment 8, wherein the memory controller is configured to:

receive a power fail signal; and in response to receiving the power fail signal and the cache line comprising a memory write request:

selectively commit the cache line to the persistent memory if the cache line directed to the persistent memory; and otherwise, selectively refrain from committing the cache line to the volatile memory if the cache line is directed to the volatile memory.

Example Embodiment 10. The integrated circuit system of example embodiment 9, comprising a battery backup configured to power the integrated circuit system when the power fail signal is asserted on the integrated circuit system, and wherein the battery backup is configured to support committing persistent cache lines subsequent to the power fail signal.

Example Embodiment 11. The integrated circuit system of example embodiment 15, wherein the battery backup is sized based upon a queue length corresponding to an amount of cache lines to be committed to the persistent memory and not based upon a queue length corresponding to an amount of cache lines to be committed to the volatile memory.

Example Embodiment 12. The integrated circuit system of example embodiment 8, wherein the memory controller is configured to:

receive a power fail signal; and in response to receiving the power fail signal and the cache line comprising a memory read request:

respond to the cache line with a response, wherein the response comprises a default response.

Example Embodiment 13. The integrated circuit system of example embodiment 8, comprising:

a storage coupled to the device;

wherein the device comprises a storage controller configured to manage the storage;

wherein the integrated circuit system is configured to:
receive a second cache line;
identify whether the second cache line is directed to the persistent memory, the volatile memory, or the storage; and
tag, with metadata, the cache line to distinguish the cache line from cache lines directed to the volatile memory or to the persistent memory.

Example Embodiment 14. The integrated circuit system of example embodiment 8, wherein the device comprises a field programmable gate array (FPGA) device or an application-specific integrated circuit (ASIC) device.

Example Embodiment 15. The integrated circuit system of example embodiment 8, wherein logic on the device is configured to:
receive a second cache line from the central processing unit;
determine if second cache line is directed to the persistent memory;
in response to determining that the second cache line is directed to the persistent memory:
tag the second cache line with metadata to ensure committing of the second cache line to the persistent memory; and
in response determining that the second cache line is not directed to persistent memory;
gracefully drop the second cache line.

Example Embodiment 16. The integrated circuit system of example embodiment 8, wherein the central processing unit is coupled to a second persistent memory and to a second volatile memory, and wherein the central processing unit is configured to tag a second cache line directed to the second persistent memory or to the second volatile memory to distinguish second cache lines directed to the second persistent memory from second cache lines direct to the second volatile memory.

Example Embodiment 17. A non-transitory, tangible, and computer-readable medium comprising instructions that, when executed by a processor of a memory controller, causes the memory controller to perform operations comprising:
receiving a cache line into a queue configured to store pending operations;
determining if the cache line is directed to persistent memory or non-persistent memory based upon whether the cache line is tagged with metadata;
identifying a power failure; and
in response to identifying the power failure:
committing the cache line to memory in response to the cache line being directed to persistent memory; and
refraining from committing the cache line to memory in response to the cache line being directed to non-persistent memory.

Example Embodiment 18. The non-transitory, tangible, and computer-readable medium of example embodiment 17, wherein the operations comprise, during a time when no power failure is present:
committing the cache line to memory regardless of whether the cache line is directed to persistent memory or non-persistent memory.

Example Embodiment 19. The non-transitory, tangible, and computer-readable medium of example embodiment 17, wherein the queue comprises a write pending queue.

Example Embodiment 20. The non-transitory, tangible, and computer-readable medium of example embodiment 17, wherein the cache line comprises a memory read request, and wherein the operations comprise:

responding to the cache line with a default when the cache line is directed to non-persistent memory.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

What is claimed is:

1. A method comprising:
receiving, via a coherent link and at a device of an integrated circuit system, a cache line comprising a destination address, wherein the coherent link includes coherent link soft logic in the device;
determining, via the coherent link soft logic of the device, a type of memory or storage associated with the destination address as persistent or non-persistent; and
tagging, via the coherent link soft logic of the device, the cache line with metadata in a manner indicating the type of memory or storage associated with the destination address, wherein the coherent link soft logic comprises a decoder configured to decode the cache line to determine a destination of the cache line.

2. The method of claim 1, comprising:
receiving a power fail signal at the integrated circuit system;
in response to receiving the power fail signal, to the cache line comprising a memory write request, and to the tagging indicating that the type of memory or storage associated with the destination address is persistent, selectively committing the cache line to persistent memory; and
in response to receiving the power fail signal and to the tagging indicating that the type of memory or storage associated with the destination address is non-persistent, selectively refraining from committing the cache line to volatile memory.

3. The method of claim 1, comprising, in response to receiving a power fail signal and the cache line comprising a memory read request, dropping the memory read request and returning a response indicative of the dropping.

4. The method of claim 1, comprising, in response to receiving a power fail signal and the cache line comprising a storage write request, committing the cache line to storage.

5. The method of claim 1, comprising:
in response to determining that the type of memory or storage associated with the destination address is persistent, tagging the cache line with metadata indicative of the cache line being directed to persistent memory;
in response to determining that the type of memory or storage associated with the destination address is non-persistent, refraining from tagging the cache line with the metadata indicative of the cache line being directed to persistent memory; and processing the cache line based at least in part upon the presence of metadata indicative of the cache line being directed to persistent memory.

6. The method of claim 1, comprising processing, via a memory or storage controller, the cache line regardless of what the tag of the cache line indicates.

7. The method of claim 1, wherein the device comprises a field programmable gate array (FPGA) device or an application-specific integrated circuit (ASIC) device.

8. An integrated circuit system comprising:

a central processing unit;

a device comprising:

a memory controller configured to manage memory coupled to the device; and a decoder configured to decode a cache line to determine a destination of the cache line;

a communication link coupling the device to the central processing unit;

a volatile memory coupled to the device; and a persistent memory coupled to the device;

wherein the integrated circuit system is configured to:

receive, via a coherent link and at the device of the integrated circuit system, the cache line, wherein the coherent link includes coherent link soft logic in the device;

identify, via the coherent link soft logic of the device, whether the cache line is directed to the persistent memory or the volatile memory; and tag, via the coherent link soft logic of the device, the cache line with metadata to distinguish cache lines directed to the persistent memory from cache lines directed to the volatile memory, wherein the coherent link soft logic of the device comprises the decoder configured to decode the cache line to determine the destination of the cache line.

9. The integrated circuit system of claim 8, wherein the memory controller is configured to:

receive a power fail signal; and in response to receiving the power fail signal, to the cache line comprising a memory write request, and to the tagging indicating that the cache line is directed to the persistent memory, selectively commit the cache line to the persistent memory; and in response to receiving the power fail signal and to the tagging indicating that the cache line is directed to non-persistent memory, selectively refrain from committing the cache line to the volatile memory.

10. The integrated circuit system of claim 9, comprising a battery backup configured to power the integrated circuit system when the power fail signal is asserted on the integrated circuit system, and wherein the battery backup is configured to support committing persistent cache lines subsequent to the power fail signal.

11. The integrated circuit system of claim 10, wherein the battery backup is sized based upon a queue length corresponding to an amount of cache lines to be committed to the persistent memory and not based upon a queue length corresponding to an amount of cache lines to be committed to the volatile memory.

12. The integrated circuit system of claim 8, wherein the memory controller is configured to:

receive a power fail signal; and in response to receiving the power fail signal and the cache line comprising a memory read request, respond to the cache line with a response, wherein the response comprises a default response.

13. The integrated circuit system of claim 8, comprising:

a storage coupled to the device;

wherein the device comprises a storage controller configured to manage the storage;

wherein the integrated circuit system is configured to:

receive a second cache line;

identify whether the second cache line is directed to the persistent memory, the volatile memory, or the storage; and tag, with metadata, the cache line to distinguish cache lines directed to the volatile memory from cache lines directed to the persistent memory.

14. The integrated circuit system of claim 8, wherein the device comprises a field programmable gate array (FPGA) device or an application-specific integrated circuit (ASIC) device.

15. The integrated circuit system of claim 8, wherein logic on the device is configured to:

receive a second cache line from the central processing unit;

determine if the second cache line is directed to the persistent memory;

in response to determining that the second cache line is directed to the persistent memory, tag the second cache line with metadata to ensure committing of the second cache line to the persistent memory; and in response to determining that the second cache line is not directed to the persistent memory, drop the second cache line.

16. The integrated circuit system of claim 8, wherein the central processing unit is coupled to a second persistent memory and to a second volatile memory, and wherein the central processing unit is configured to tag a second cache line as directed to the second persistent memory or to the second volatile memory to distinguish second cache lines directed to the second persistent memory from second cache lines direct to the second volatile memory.

17. A non-transitory, tangible, and computer-readable medium comprising instructions that, when executed by a processor of a memory controller, cause the memory controller to perform operations comprising:

receiving, via a coherent link and at a device of an integrated circuit system, a cache line into a queue configured to store pending operations, wherein the coherent link includes coherent link soft logic in the device;

determining, via the coherent link soft logic of the device, if the cache line is directed to persistent memory or non-persistent memory based upon whether the cache line is tagged with metadata, wherein the coherent link soft logic of the device comprises a decoder configured to decode the cache line to determine a destination of the cache line;

identifying a power failure; and in response to identifying the power failure:

committing the cache line to memory in response to the cache line being directed to the persistent memory; and refraining from committing the cache line to memory in response to the cache line being directed to the non-persistent memory.

18. The non-transitory, tangible, and computer-readable medium of claim 17, wherein the operations comprise, during a time when no power failure is present, committing the cache line to memory regardless of whether the cache line is directed to the persistent memory or the non-persistent memory.

19. The non-transitory, tangible, and computer-readable medium of claim 17, wherein the queue comprises a write pending queue.

20. The non-transitory, tangible, and computer-readable medium of claim 17, wherein the cache line comprises a memory read request, and wherein the operations comprise:

responding to the cache line with a default response; and dropping the cache line.

\* \* \* \* \*